Jan. 20, 1948.  W. S. FIELDS  2,434,691
SAW SHARPENER
Filed Dec. 10, 1945  4 Sheets-Sheet 1

Inventor
Warren S. Fields,

By *Clarence A. O'Brien
and Harvey B. Jacobson*
Attorneys

Jan. 20, 1948.  W. S. FIELDS  2,434,691
SAW SHARPENER
Filed Dec. 10, 1945  4 Sheets-Sheet 2

Inventor
Warren S. Fields,

By *Clarence A. O'Brien and Harvey B. Jacobson*
Attorneys

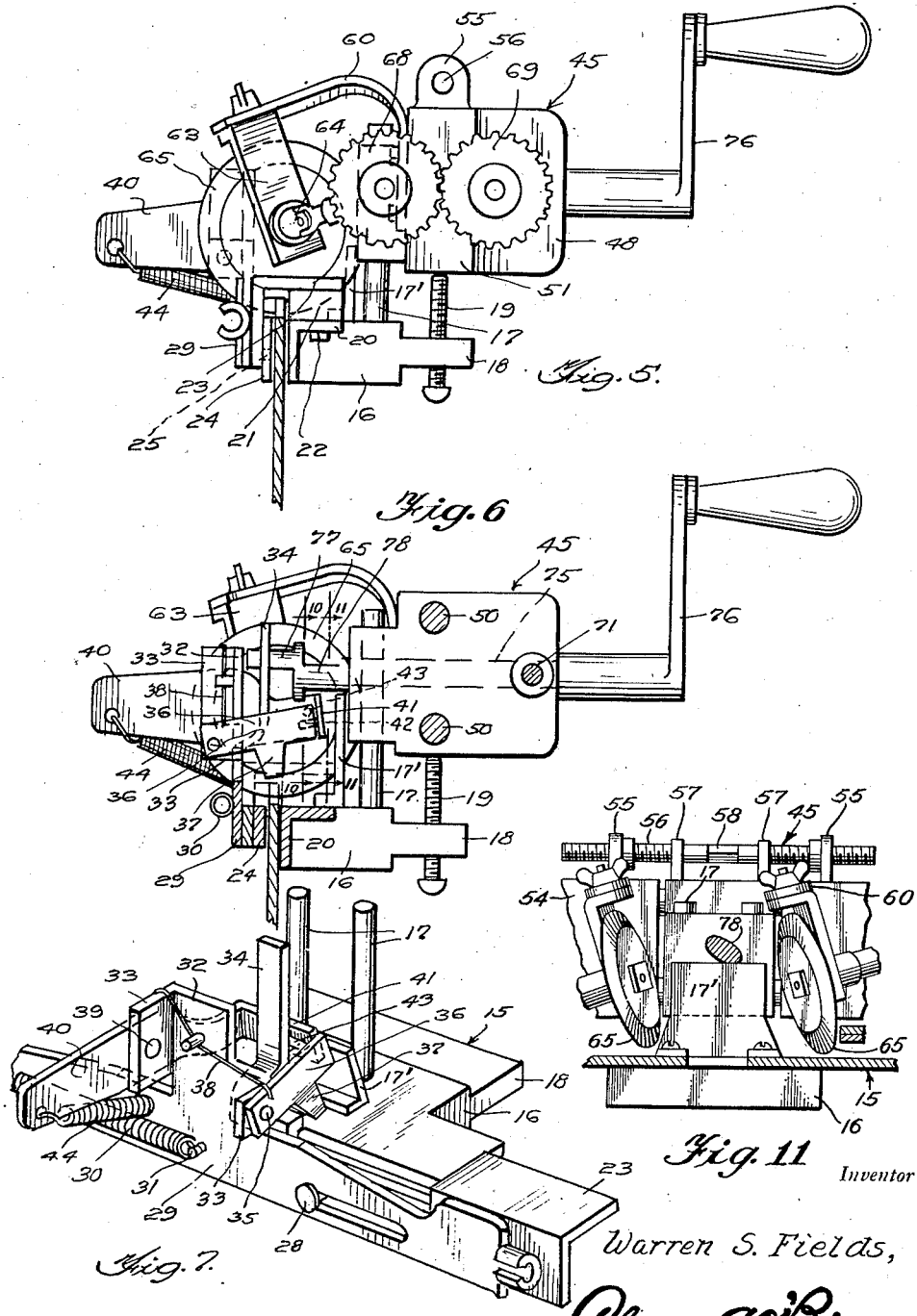

Jan. 20, 1948.  W. S. FIELDS  2,434,691
SAW SHARPENER
Filed Dec. 10, 1945  4 Sheets-Sheet 4
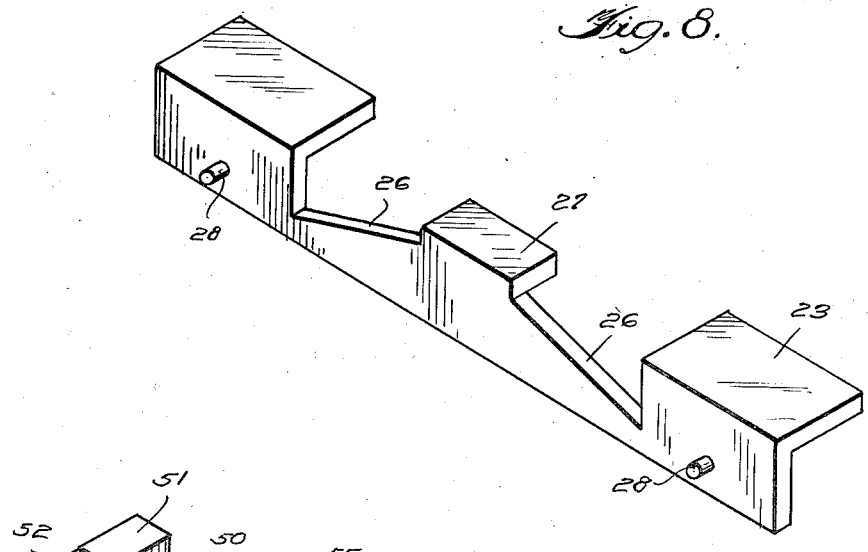
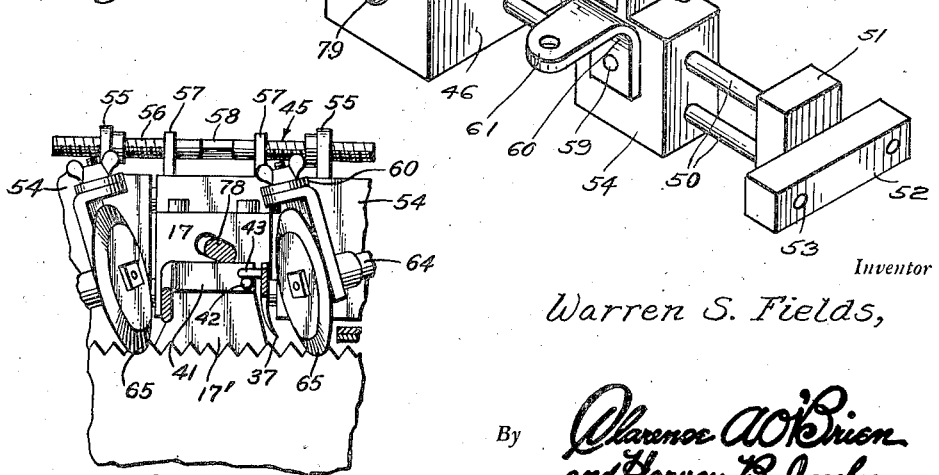
Inventor
Warren S. Fields,
By Clarence A. O'Brien
and Harvey B. Jacobson
Attorneys Patented Jan. 20, 1948

2,434,691

UNITED STATES PATENT OFFICE 2,4334,691

SAW SHARPENER

Warren S. Fields, Sacramento, Calif.

Application December 10, 1945, Serial No. 633,906

6 Claims. (Cl. 76—37)

This invention relates to a saw sharpener and has for its primary object to rapidly and easily sharpen the teeth of an ordinary saw blade and to grind the cutting edges of the teeth at the proper angle.

Another object is automatically to advance the saw tooth sharpening element as the sharpening of the saw teeth progresses.

The above and other objects may be attained by employing this invention which embodies among its features a carriage adapted to be advanced along a saw blade, saw tooth sharpening wheels carried by the carriage, and means operable in unison with the rotation of the saw blade sharpening wheels intermittently to advance the carriage to a position for sharpening an adjacent tooth.

Other features include means for adjusting the angular position of the saw tooth sharpening wheels with relation to the teeth on the saw blade to be sharpened and also means to regulate the distance between the wheels so that they may be adjusted with accuracy properly to engage the teeth to be sharpened.

Still other features include jaws on the carriage adapted to straddle the toothed edge of a saw blade and means to regulate the depth to which the wheels may enter the spaces between the saw teeth.

In the drawings:

Figure 5 is an end view of a saw sharpener embodying the features of this invention showing the same mounted on a saw blade, the latter being illustrated in sections;

Figure 6 is a transverse sectional view through the saw sharpener of this invention;

Figure 7 is a perspective view illustrating the carriage advancing means in detail;

Figure 8 is a perspective view of the main supporting angle; and

Figure 9 is a perspective view of the carrier frame showing the sharpening wheels and their driving mechanism omitted.

Figure 10 is a sectional view taken substantially along the line 10—10 of Figure 6, certain portions being shown in elevation, and Figure 11 is a sectional view taken substantially along the line 11—11 of Figure 6, certain portions being shown in elevation.

Figure 1:
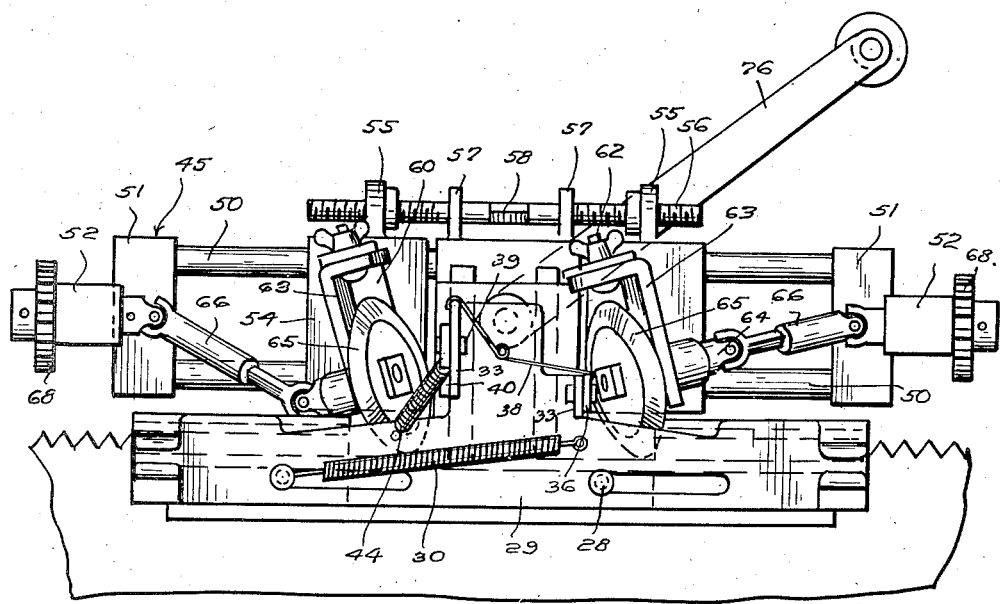
Figure 1 is a side view in elevation of a saw sharpening device embodying the features of this invention mounted on a saw blade ready for use.

Referring to the drawings in detail, my improved saw sharpener comprises essentially two separate or separable parts, namely a carriage designated generally 15 which is adapted to be engaged over the toothed edge of a saw blade and a sharpening wheel carrier designated generally 45 which is adapted to be adjustably mounted on the carriage and to move in unison therewith as the carriage advances along the saw blade. The carriage 15 comprises a bed plate 16 in which are fixed a pair of spaced vertically extending pins 17 upon which the wheel carrier 45, to be more fully hereinafter described, is mounted. A flange 18 extends rearwardly from the bed plate 16 and is provided with an internally screw-threaded opening for the reception of an adjusting screw 19 which projects upwardly in parallel relation to the pins 17 in such a position as to adjustably support the carrier 30 when the latter is in place on the carriage 15. Fixed to the upper face of the bed plate 16 and extending upwardly therefrom in spaced parallel relation to the pins 17 slightly in advance thereof is a lift plate 17' the purpose of which will more fully hereinafter appear. Extending longitudinally from opposite ends of the bed plate 16 is an angle 20 to the upper surface of which adjacent opposite ends are mounted spacer blocks 21 which are held in place by bolts 22. Supported on the upper faces of the spacer blocks 21 is an angle 23, the legs of which are in spaced parallel relation to the legs of the angles 20 to form a recess in which the blade of the saw to be sharpened is received. A clamp jaw 24 is loosely supported adjacent the inner face of the forward depending leg of the angle 23 on pins 25 carried by the angle and this clamp jaw cooperates with the forward depending leg of the angle 20 in gripping a saw blade when the saw sharpener is in place thereon. The angle 23 is cut away as at 26 to form midway of its length an inwardly projecting flange which is of less width than the topmost flange of the angle 23 to form a land or limit stop which rests on the teeth of the saw blade when the sharpener is in place thereon. Extending forwardly from the front depending flange of the angle 23 adjacent opposite ends are pins 28 upon which a longitudinally sliding bar 29 is mounted. One end of a retractile coil spring 30 is attached to one of the pins 28 while the opposite end of the spring 30 is anchored as at 31 to the bar 29 to urge the same toward one end of the angle 23, as will be readily understood upon reference to the drawings. Extending upwardly from the bar 29 midway of its length is a standard 32 carrying at opposite ends ears 33 and carried by the bar adjacent the standard is a vertically extending rearwardly offset post 34, the purpose of which will be more fully hereinafter described. Pivoted as at 35 to one of the ears 33 is a lever 36 carrying a saw tooth engaging dog 37 which lever is normally urged downwardly into saw blade engaging position under the influence of a spring 38. Mounted for rocking movement about a pivot 39 on the opposite ear 33 is a lever 40 having an angular extension 41 which terminates adjacent the free end of the lever 36 and is provided with a forwardly extending pin 42 which is adapted to engage beneath a pin 43 so that when the lever 40 is rocked about its pivot the lever 36 will be moved upwardly against the influence of the spring 38. A retractile coil spring 44 is connected to the free end of the lever 40 and the opposite end of said spring is attached to the slide bar 29 in such a manner as to urge the free end of the lever 40 downwardly so as to elevate the arm 41 and the lever 36 against the spring 38.

Figure 2:
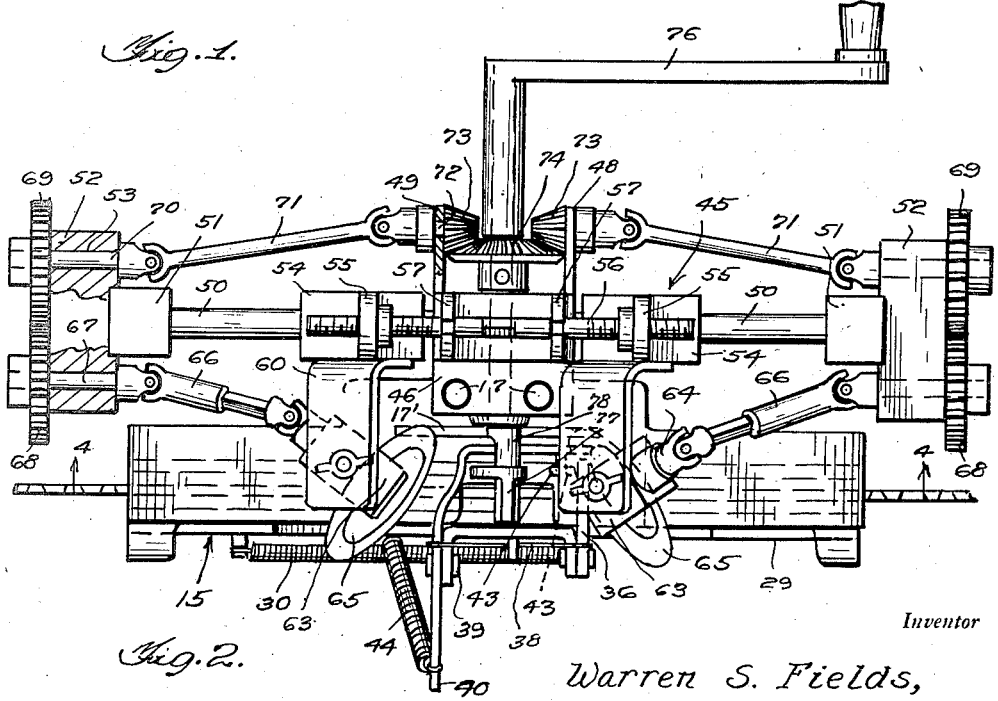
Figure 2 is a top plan view of Figure 1.

The carrier 45 previously referred to comprises a main supporting block 46 formed with a pair of spaced vertically extending openings 47 which are adapted to receive the pins 17 when the device is assembled for operation. This block 46 is provided at its rear end with a pair of spaced rearwardly extending ears 48 which are pierced as at 49 (Figure 2) with aligning apertures for a purpose to be more fully hereinafter described. Extending laterally from opposite sides of the block 46 are spaced parallel guide bars 50 to the outer ends of which are fixed cross members 51 carrying transversely extending supports 52 which project beyond the side edges of the members 51 and are pierced as at 53 for a purpose to be more fully hereinafter explained. Slidably mounted on each pair of guide bars 50 are cross heads 54, each of which is provided with an upstanding ear 55 which is pierced to receive a threaded shaft 56 which is mounted for rotation but against endwise movement in a pair of upstanding ears 57 carried by the blocks 46. The mid portion of the shaft 56 is provided with a squared portion 58 for engagement by a wrench or other suitable instrument for rotating the shaft in the ears 55 and 57, it being understood that the threads on the shaft are respectively right and left so that upon rotation of the said shaft the cross heads 54 will be moved toward or away from one another along the guide bars 50. Pivotally mounted at 59 on each cross head 54 is an angular bracket 60, the free end of which is pierced as at 61 to receive an attaching bolt 62 by means of which an angular bracket 63 may be adjustably connected to the bracket 60.

Rotatably mounted in the depending leg of each bracket 63 is a stub shaft 64 carrying at one end a saw sharpening wheel 65 and connected at its opposite end through the medium of a suitable universal joint is a telescopic shaft 66. Rotatably mounted in each opening 53 of the cross member 52 at each end of the carrier 45 is a stub shaft 67, one end of which is connected by a universal joint to the telescopic shaft 66 while the opposite end of said stub shaft 67 carries a drive pinion 68. This drive pinion has meshing engagement with a like drive pinion 69 which is mounted on the end of a stub shaft 70 mounted for rotation in the opening 53 at the end of the cross member 52 opposite that in which the shaft 67 is mounted. The shaft 70 has driving connection through the medium of a suitable universal joint with a shaft 71 which in turn is connected through the medium of a suitable universal joint to a drive stub shaft 72 mounted for rotation in each opening 49. Each stub shaft 72 carries at the end opposite to that connected to the shaft 71 a bevelled pinion 73 which meshes with a bevelled gear 74 carried by the main drive shaft 75 which is mounted for rotation in an axial opening 79 extending longitudinally through the block 46. The end of the drive shaft projecting toward the rear of the device, i. e., that portion projecting beyond the pinion 74 is fitted with a suitable hand crank 76 by which rotary motion may be imparted to the shaft. The end of the shaft opposite that carrying the hand crank 76 is provided with an eccentric finger 77 which, when the parts are assembled, engages the upstanding arm 34 previously described. An eccentric portion 78 is formed on the drive shaft 75 adjacent the eccentric finger 77 and is adapted to ride on the extension 41 of the lever 40 so as to periodically rock the lever 40 about its pivot 39 and simultaneously cause the lever 36 to be depressed so as to move the dog 37 downwardly into engagement between the teeth on the saw blade of the saw that is being sharpened.

Figure 3:
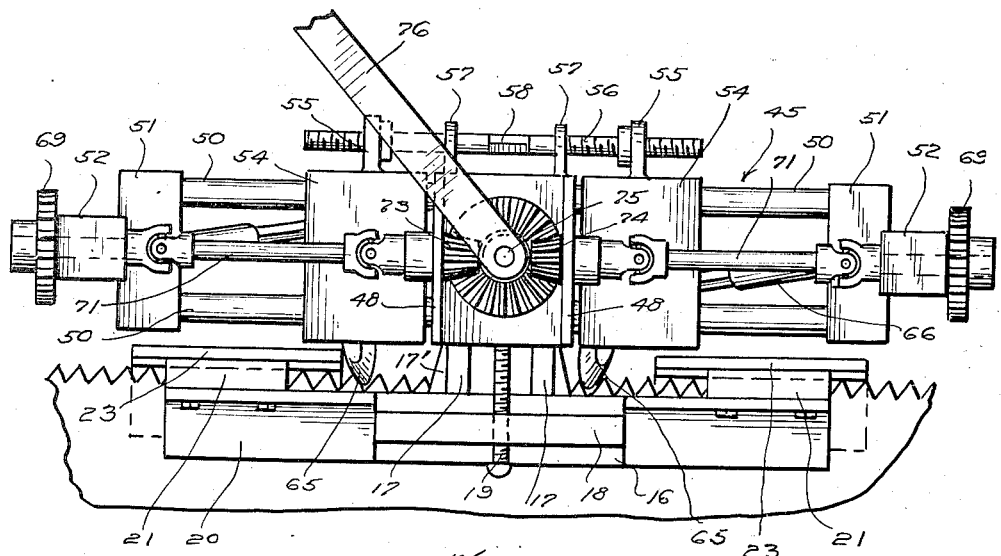
Figure 3 is a rear view of Figure 1.
Figure 4:
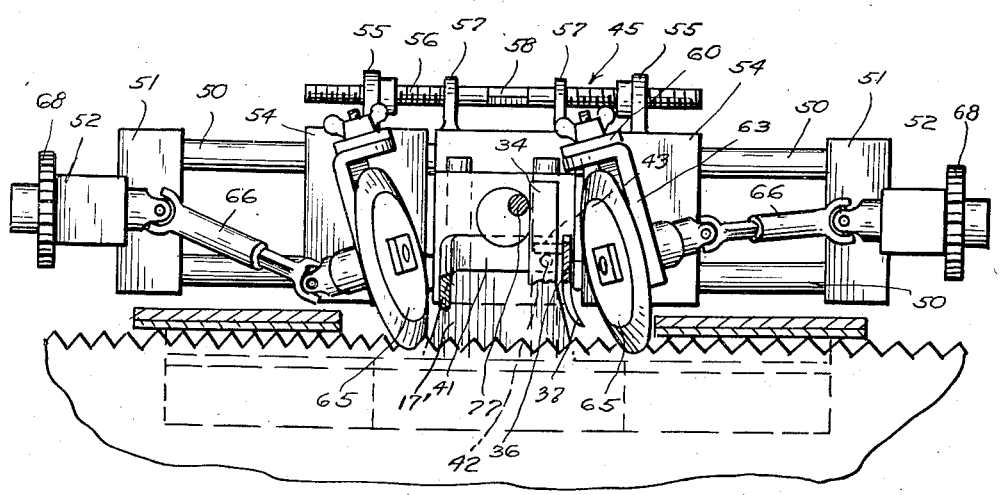
Figure 4 is a longitudinal sectional view taken substantially on the line 4—4 of Figure 2.

In operation the carrier 45 is assembled with the carriage 15 by introducing the pins 17 into the openings 47 and the slide bar 29 is moved to its fullest extent against the tension of the spring 30 so as to position the finger 77 in operative position with relation to the arm 34. The saw sharpener thus assembled is then placed on a saw blade as illustrated in Figures 3 and 4, with the blade clamped between the depending flange of the angle 20 and the clamp bar 24. In this position the saw sharpener will be held in proper relation to the saw blade and upon rotating the hand crank 76, the bevelled gear 74 will drive the pinions 73 and their respective shafts 71 so as to impart rotary motion to the pinions 69 and 68, thus rotating the stub shafts 67 and the telescopic shafts 66, which, in turn, drive the stub shafts 64 to which the sharpening wheels 65 are attached. The wheels may be adjusted to various angular positions with relation to the saw blade by moving the brackets 60 about their pivots 59 and adjusting the brackets 63 on the brackets 60, it being understood that the telescopic shafts and the universal joints in the system permit such angular movement. The distance between the wheels may also be regulated by turning the threaded shaft 56 so as to move the cross heads 54 toward or away from one another so as to secure accurate location of the wheels 65 on the saw blade and the depth of cut may be regulated by adjusting the screw 19. Simultaneously with rotation of the shaft 75, the eccentric finger 77 will engage the arm 34 thus causing the slide bar 49 to reciprocate with relation to the angle 23. Such reciprocal motion causes the lever 40 and the lever 36 to reciprocate longitudinally with relation to the angle 23 and through the engagement of the eccentric 78 with the arm 41 of the lever 40, the lever 36 will be periodically depressed so as to cause the dog 37 periodically to enter between the teeth of the saw blade and by reason of this anchorage when the slide bar 29 is moved with relation to the angle 23, the entire carriage will be shifted longitudinally on the saw blade so as to move the sharpening wheels 65 in position to sharpen the next adjacent saw tooth. In this way the device will traverse the entire length of a saw blade sharpening each individual tooth at the proper angle and the entire operation will be completely automatic simply by rotating the hand crank 76. Simultaneously with the depression of the lever arm 41 the eccentric 78 contacts the upper edge of the plate 17' bodily to lift the wheel carrier 45 with relation to the carriage 15 a distance sufficient to cause the wheels 65 to clear the upper edges of the saw teeth during the shifting of the carriage on the saw blade.

While in the foregoing there has been shown and described the preferred embodiment of this invention it is to be understood that minor changes in the details of construction, combination, and arrangement of parts may be resorted to without departing from the spirit and scope of the invention as claimed.

I claim:

1. A saw sharpener which includes an elongated carriage adapted to slide along a saw blade, a slide plate movable longitudinally with relation to the carriage, a dog carried by the slide plate and adapted to engage a tooth of the saw blade, at least one saw sharpening wheel mounted on the carriage to move perpendicularly to the direction of movement of the carriage, means to rotate the wheel in contact with a saw tooth to sharpen the latter, means operating in unison with the wheel rotating means intermittently to move the wheel perpendicularly to the carriage and means simultaneously to move the dog into tooth engaging position and the slide plate longitudinally of the carriage whereby the carriage will be advanced periodically along the saw blade.

2. A saw sharpener comprising a carriage adapted to slide horizontally along a saw blade, a sharpening wheel carrier mounted on the carriage for vertical movement relative thereto, at least one sharpening wheel rotatably mounted on the carrier, means to rotate the wheel, an eccentric rotatable in unison with the wheel rotating means, means on the carriage adapted periodically to be engaged by the eccentric to lift the wheel carrier relative to the carriage during sliding movement thereof on the saw blade, a second eccentric on the wheel rotating means and depressible means on the carriage adapted to be engaged by the second eccentric to shift the carriage longitudinally on the saw blade during the elevation of the wheel carrier.

3. A saw sharpener comprising a carriage adapted to slide horizontally along a saw blade, a sharpening wheel carrier mounted on the carriage for vertical movement relative thereto, at least one sharpening wheel rotatably mounted on the carrier, means to rotate the wheel, an eccentric rotatable in unison with the wheel rotating means, means on the carriage adapted periodically to be engaged by the eccentric to lift the wheel carrier relative to the carriage during sliding movement thereof on the saw blade, a depressible dog carried by the carriage adapted to be engaged by the eccentric to engage between a pair of teeth on the saw blade during the lifting of the carrier and means operating in unison with the eccentric positively to move the dog longitudinally with relation to the carriage while it is so depressed.

4. A saw sharpener which includes a carriage adapted to be advanced along the toothed edge of a saw blade, a carrier mounted on the carriage to move in a path which lies perpendicular to the path of advance of the carriage, at least one saw sharpening wheel mounted on the carrier, a shaft mounted in the carrier to rotate about an axis which lies perpendicular to the direction of advance of the carriage and perpendicular to the path of movement of the carrier and to rotate the sharpening wheel, means actuated upon rotation of the shaft intermittently to move the carrier along the perpendicular path toward and away from the carriage, means actuated upon rotation of the shaft to advance the carriage along the saw blade during the period that the carrier is moved away from the carriage and means to rotate the shaft.

5. A saw sharpener which includes a carriage adapted to be advanced along the toothed edge of a saw blade, a carrier mounted on the carriage to move in a path which lies perpendicular to the path of advance of the carriage, at least one saw sharpening wheel mounted on the carrier, a shaft mounted in the carrier to rotate about an axis which lies perpendicular to the direction of advance of the carriage and perpendicular to the path of movement of the carrier, flexible driving means establishing driving connection between the shaft and the saw sharpening wheel, means actuated upon rotation of the shaft intermittently to move the carrier along the perpendicular path toward and away from the carriage, means actuated upon rotation of the shaft to advance the carriage along the saw blade during the period that the carrier is moved away from the carriage and means to rotate the shaft.

6. A saw sharpener which includes a carriage adapted to be advanced along the toothed edge of a saw blade, a carrier mounted on the carriage to move in a path which lies perpendicular to the path of advance of the carriage, a shaft mounted in the carrier to rotate about an axis which lies perpendicular to the path of advance of the carriage and perpendicular to the path of movement of the carrier, at least one saw sharpening wheel adjustably mounted on the carrier to rotate about an axis which lies at an angle to the axis of the shaft, means establishing driving connection between the shaft and the saw sharpening wheel, means actuated upon rotation of the shaft intermittently to move the carrier along the perpendicular path away from the carriage, means actuated by the rotation of the shaft to advance the carriage along the saw blade during the period that the carrier is moved away from the carriage and means to rotate the shaft.

WARREN S. FIELDS.

REFERENCES CITED

The following references are of record in the file of this patent:

UNITED STATES PATENTS

| Number | Name | Date |
| --- | --- | --- |
| 1,561,231 | Hatz | Nov. 10, 1925 |
| 1,762,854 | Cooper et al. | June 10, 1930 |
| 2,396,597 | Nadon | Mar. 12, 1946 |
| 1,198,801 | Wilkinson | Sept. 19, 1916 |
| 158,964 | Mizell et al. | Jan. 19, 1875 |
| 620,726 | Wood | Mar. 7, 1899 |
| 2,146,686 | Raxll | Feb. 7, 1939 |
| 1,491,706 | Klin | Apr. 22, 1924 |
| 548,197 | Holecek | Oct. 22, 1895 |
| 1,494,995 | Craddock | May 20, 1924 |
| 437,628 | Smith | Sept. 30, 1890 |

FOREIGN PATENTS

| Number | Country | Date |
| --- | --- | --- |
| 126,873 | Switzerland | July 16, 1928 |